(12) United States Patent
Araki (10) Patent No.: US 11,951,605 B2
(45) Date of Patent: Apr. 9, 2024

(54) ADAPTER AND ROTARY TOOL

(71) Applicant: MAKITA CORPORATION, Anjo (JP)

(72) Inventor: Yuta Araki, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 18/090,203

(22) Filed: Dec. 28, 2022

(65) Prior Publication Data
US 2023/0241754 A1 Aug. 3, 2023

(30) Foreign Application Priority Data
Jan. 28, 2022 (JP) .................. 2022-012269

(51) Int. Cl.
*B25F 5/00* (2006.01)
*B25F 5/02* (2006.01)
B25F 3/00 (2006.01)
H02P 3/06 (2006.01)

(52) U.S. Cl.
CPC .................. *B25F 5/02* (2013.01); B25F 3/00 (2013.01); H02P 3/06 (2013.01)

(58) Field of Classification Search
CPC ................. B25F 3/00; H01M 50/247
See application file for complete search history.

(56) References Cited

U.S. PATENT DOCUMENTS

| | | | | |
|---|---|---|---|---|
| 6,577,104 B2* | 6/2003 | Sakakibara | ........... | H02J 7/0031 320/135 |
| 6,700,341 B2* | 3/2004 | Schaer | ........... | B25F 5/00 318/434 |
| 7,055,620 B2* | 6/2006 | Nadig | ........... | B25F 5/00 173/217 |
| 10,675,747 B2* | 6/2020 | Gut | ........... | B25F 5/00 |
| 10,953,532 B2* | 3/2021 | Sunabe | ........... | B25D 11/005 |
| 11,278,297 B2* | 3/2022 | Hines | ........... | A61B 90/06 |
| 2007/0008162 A1* | 1/2007 | Gossett | ........... | B25C 7/00 340/680 |
| 2013/0319710 A1* | 12/2013 | Aoki | ........... | B25F 5/00 173/176 |
| 2014/0231113 A1* | 8/2014 | Steurer | ........... | B25F 5/00 173/1 |

FOREIGN PATENT DOCUMENTS

| | | | | |
|---|---|---|---|---|
| JP | 4550357 B2 | 9/2010 | | |
| JP | 5980310 B2 * | 8/2016 | ........... | B25F 3/00 |
| JP | 5980310 B2 | 8/2016 | | |
| WO | 2013014914 A2 | 1/2013 | | |

* cited by examiner

*Primary Examiner* — Eyamindae C Jallow
(74) *Attorney, Agent, or Firm* — Oliff PLC

(57) ABSTRACT

An adapter is configured to be removably mounted to a rotary tool, the rotary tool having a battery mounting part configured such that a battery can be removably mounted thereto and an output shaft that is rotationally driven by power supply from the battery mounted to the battery mounting part. The adapter has a housing, a first mounting part that is formed on the housing and configured to be removably mounted to the battery mounting part, a second mounting part that is formed on the housing and configured such that the battery can be removably mounted thereto, and a detection part that is configured to detect the moving state of the adapter in at least one direction.

10 Claims, 11 Drawing Sheets

ADAPTER AND ROTARY TOOL

CROSS REFERENCE TO RELATED ART

The present application claims priority to Japanese Patent Application No. 2022-12269 filed on Jan. 28, 2022, the disclosure of which is hereby incorporated by reference in its entirety.

TECHNICAL FIELD

The present disclosure relates to an adapter and a rotary tool.

BACKGROUND

Japanese Patent No. 5980310 discloses an adapter for a power tool that is driven by a removable battery pack. This adapter has a controller, a signal terminal, a power terminal, a communication part and a display. The adapter is configured such that a controller of the battery pack can communicate with an adapter controller via a controller of a power tool when the battery pack is connected to the power tool.

SUMMARY

The adapter disclosed in JP5980310 allows a user to change various kinds of thresholds of a battery pack and a power tool via the adapter. Recently, however, it is desired to provide a technique for detecting the state of a rotary tool that is a kind of a power tool, by an adapter itself.

According to a first aspect of the present disclosure, an adapter is provided that is configured to be removably mounted to a rotary tool. The rotary tool has a battery mounting part configured such that a battery can be removably mounted thereto, and an output shaft that is rotationally driven by power supply from the battery mounted to the battery mounting part. The adapter has a housing, a first mounting part, a second mounting part and a detection part. The first and second mounting parts are on the housing. The first mounting part is configured to be removably mounted to the battery mounting part. The second mounting part is configured such that the battery can be removably mounted thereto. The detection part is configured to detect the moving state of the adapter in at least one direction.

According to this aspect, even if the rotary tool does not have a function of detecting its moving state, the moving state of the rotary tool can be detected by the adapter being mounted to the rotary tool. Further, the adapter can be mounted to the rotary tool by utilizing the battery mounting part of the rotary tool, and the battery can be mounted to the second mounting part of the adapter. Therefore, the adapter can be provided that is applicable to various kinds of rotary tools configured such that the battery can be removably mounted thereto.

The "rotary tool" includes a tool capable of performing drilling operation and fastening operation on a workpiece, a cutting tool capable of performing cutting operation, and a grinding tool capable of performing grinding operation, by rotationally driving a tool accessory mounted onto an output shaft. Such a rotary tool includes a driver drill, a vibration drill, a hammer drill, a circular saw and a grinder.

According to a second aspect of the present disclosure, a rotary tool is provided. The rotary tool has a battery mounting part, a motor, an output shaft, and an adapter as defined in the first aspect. The battery mounting part is configured such that the battery can be removably mounted thereto. The motor is configured to be driven by power supply from the battery mounted to the battery mounting part. The output shaft is configured to be rotationally driven by the motor. The adapter is removably mounted to the battery mounting part.

According to this aspect, even if the rotary tool does not have a function of detecting its moving state, the moving state of the rotary tool can be detected by the adapter being mounted to the rotary tool.

DETAILED DESCRIPTION OF THE EMBODIMENT

In one non-limiting embodiment according to the present disclosure, the second mounting part may be provided on a side opposite to the first mounding part on the housing.

According to this embodiment, when the first mounding part of the adapter is mounted onto the battery mounting part of the rotary tool and the battery is mounted onto the second mounting part of the adapter, the battery mounting part, the adapter and the battery are in this order in a direction in which the first and second mounting parts are in parallel. Therefore, the rotary tool can be formed with slim appearance in a region from the battery mounting part of the rotary tool to the battery.

In addition or in the alternative to the preceding embodiments, the at least one direction may include a plurality of directions (such as three directions orthogonal to each other).

According to this embodiment, the moving state of each of a plurality of rotary tools different in the extending direction of an output shaft can be detected by the adapter being mounted to the rotary tool. Therefore, the adapter can be provided that is applicable to a plurality of rotary tools different in the arrangement relationship between the extending direction of the output shaft and the battery mounting part.

In addition or in the alternative to the preceding embodiments, the adapter may further have a manipulation part that is configured to be externally manipulated by a user. The detection sensitivity of the detection part for detecting the moving state of the adapter in the at least one direction may be adjusted according to manually operation of the manipulation part._

According to this embodiment, the user can adjust the detection sensitivity of the detection part to a desired level by operating the manipulation part.

In addition or in the alternative to the preceding embodiments, the rotary tool may further have a body housing and a handle. The body housing may house the motor and at least part of the output shaft. The handle may extend in a direction crossing an axis of the output shaft. The handle may have a first end part that is connected to the body housing and a second end part on a side opposite to the first end part in the crossing direction. The battery mounting part may be provided on the second end part of the handle.

According to this embodiment, the battery mounting part is provided on the second end part of the handle, so that the adapter is mounted in a position relatively apart from the axis of the output shaft. Therefore, for example, the moving state of the rotary tool around the axis of the output shaft can be detected accurately.

In addition or in the alternative to the preceding embodiments, the rotary tool may further have a controller. The adapter may be configured to transmit a signal to the rotary tool when the moving state detected by the detection part is a predetermined state corresponding to excessive rotation of the rotary tool. The controller may be configured to stop energization to the motor according to the signal from the adapter According to this embodiment, energization to the motor is stopped when excessive rotation occurs in the rotary tool, so that the safety of the rotary tool can be enhanced.

In addition or in the alternative to the preceding embodiments, the rotary tool may be configured to function as a tool for performing drilling operation and fastening operation by rotationally driving a tool accessory around an axis of the output shaft.

According to this embodiment, occurrence of the phenomenon (which is also called kickback) that the tool is excessively rotated around the axis of the output shaft, for example, by the tool accessory being locked, during operation of the tool that performs drilling operation and fastening operation, can be detected. Therefore, even if the tool that performs drilling operation and fastening operation does not have a function of detecting kickback, kickback of the tool can be detected by the adapter being mounted to the tool.

A rotary tool and an adapter are now described as a representative embodiment according to the present disclosure with reference to FIGS. 1 to 11.

First, a driver drill 1 according to the embodiment of the present invention is described with reference to FIGS. 1 to 5. In this embodiment, the driver drill 1 is a representative example of a rotary tool, or specifically, a drilling tool that rotationally drives a removably coupled tool accessory 200 (see FIG. 2).

As shown in FIGS. 1 to 4, an outer shell of the driver drill 1 is formed by a body housing 11 and a handle 15. The body housing 11 extends along a prescribed driving axis A1 and houses a motor 2 and a driving mechanism 3.

Figure 1:
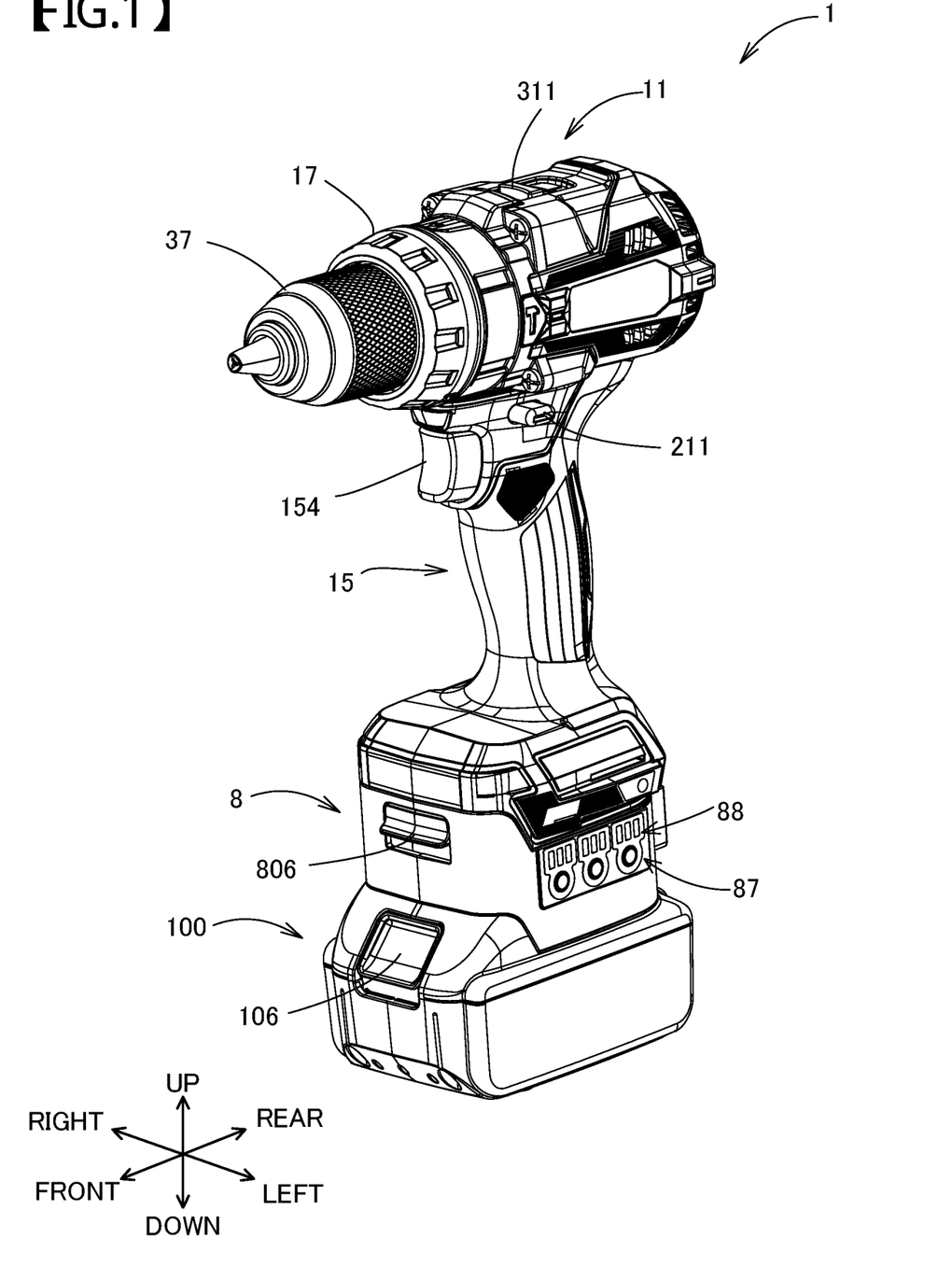
FIG. 1 is an external, perspective view of a driver drill with an adapter and a battery mounted thereto.
Figure 2:
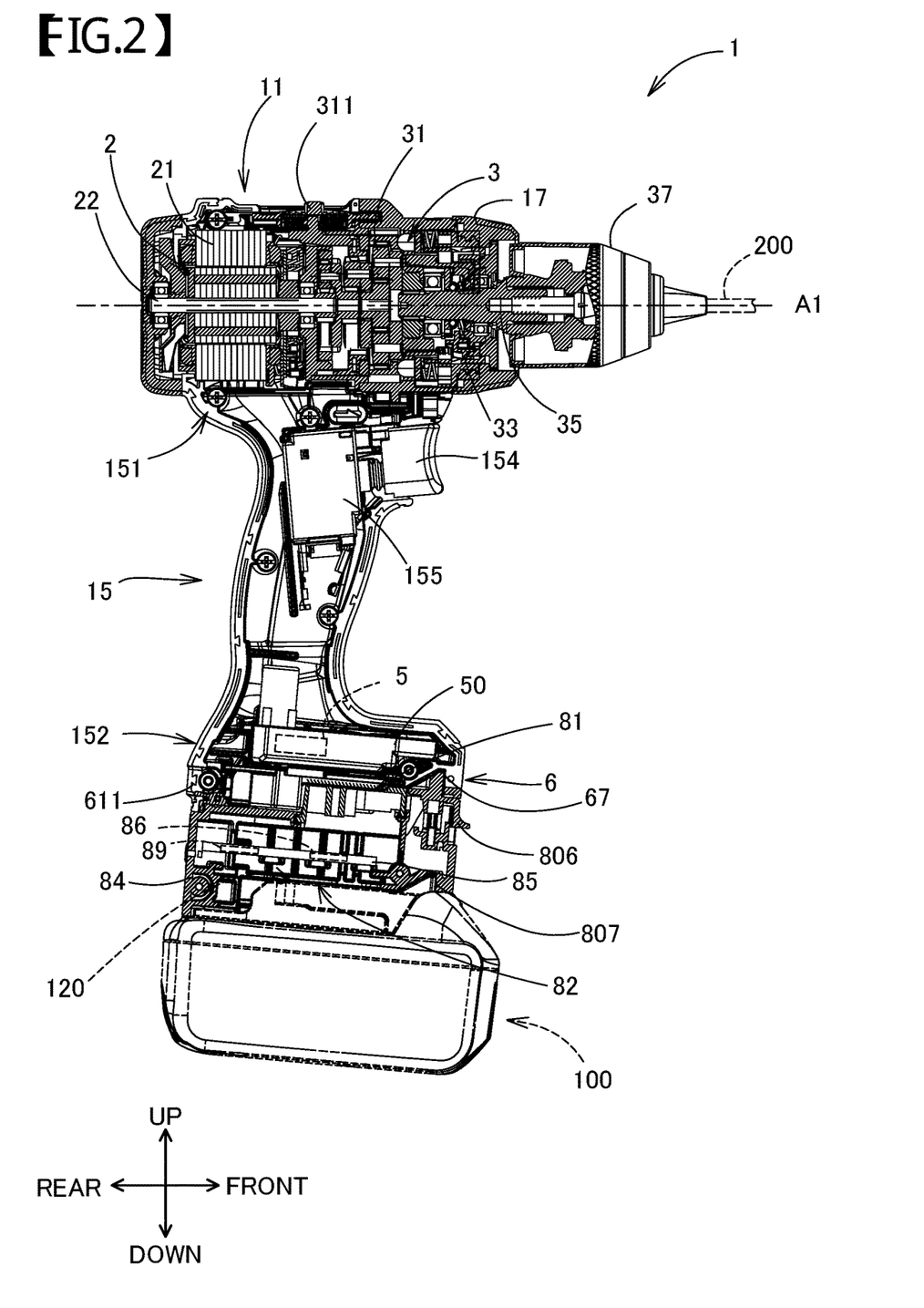
FIG. 2 is a sectional view of the driver drill with the adapter mounted thereto.
Figure 3:
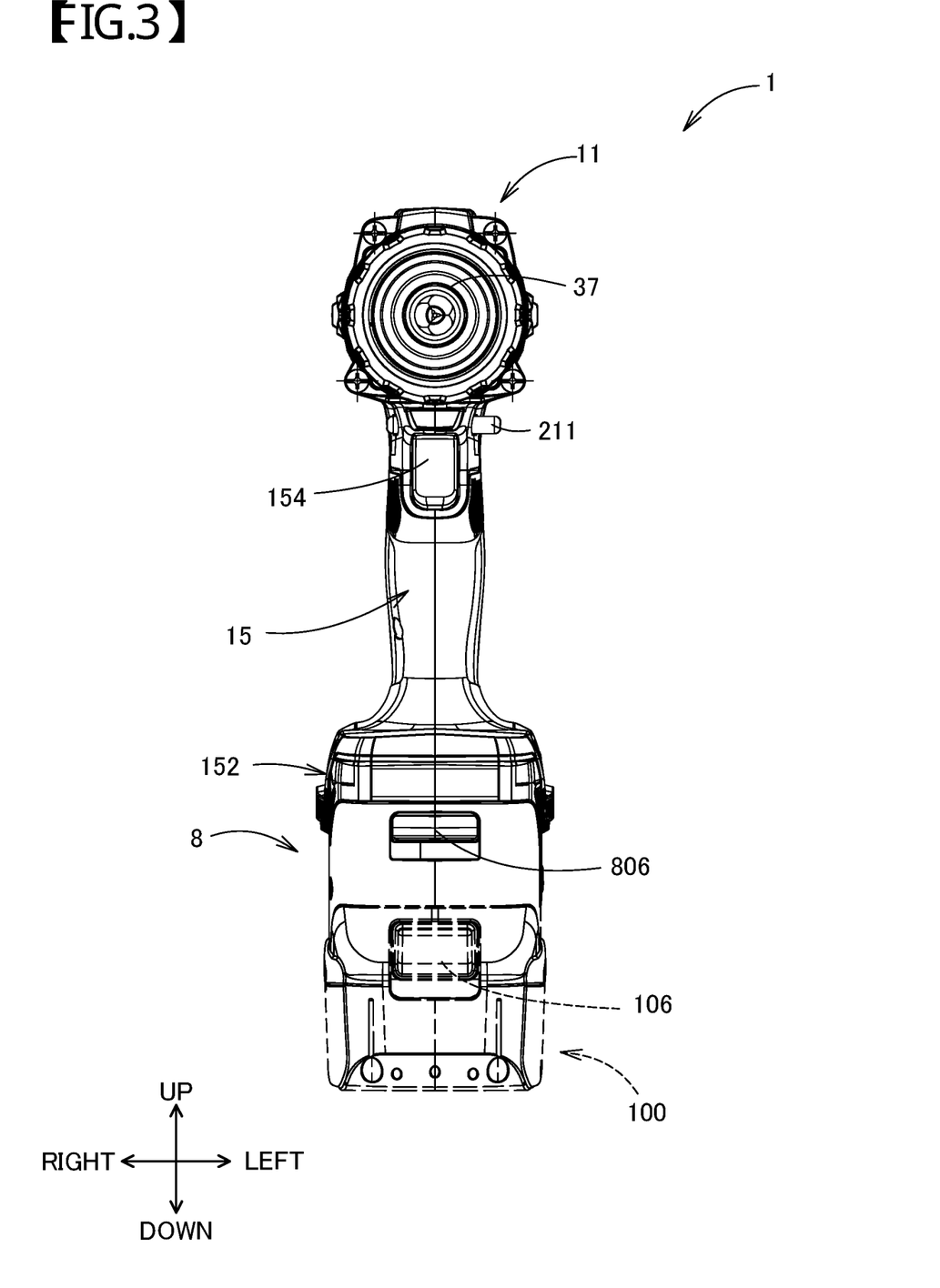
FIG. 3 is a front view of the driver drill with the adapter mounted thereto.
Figure 4:
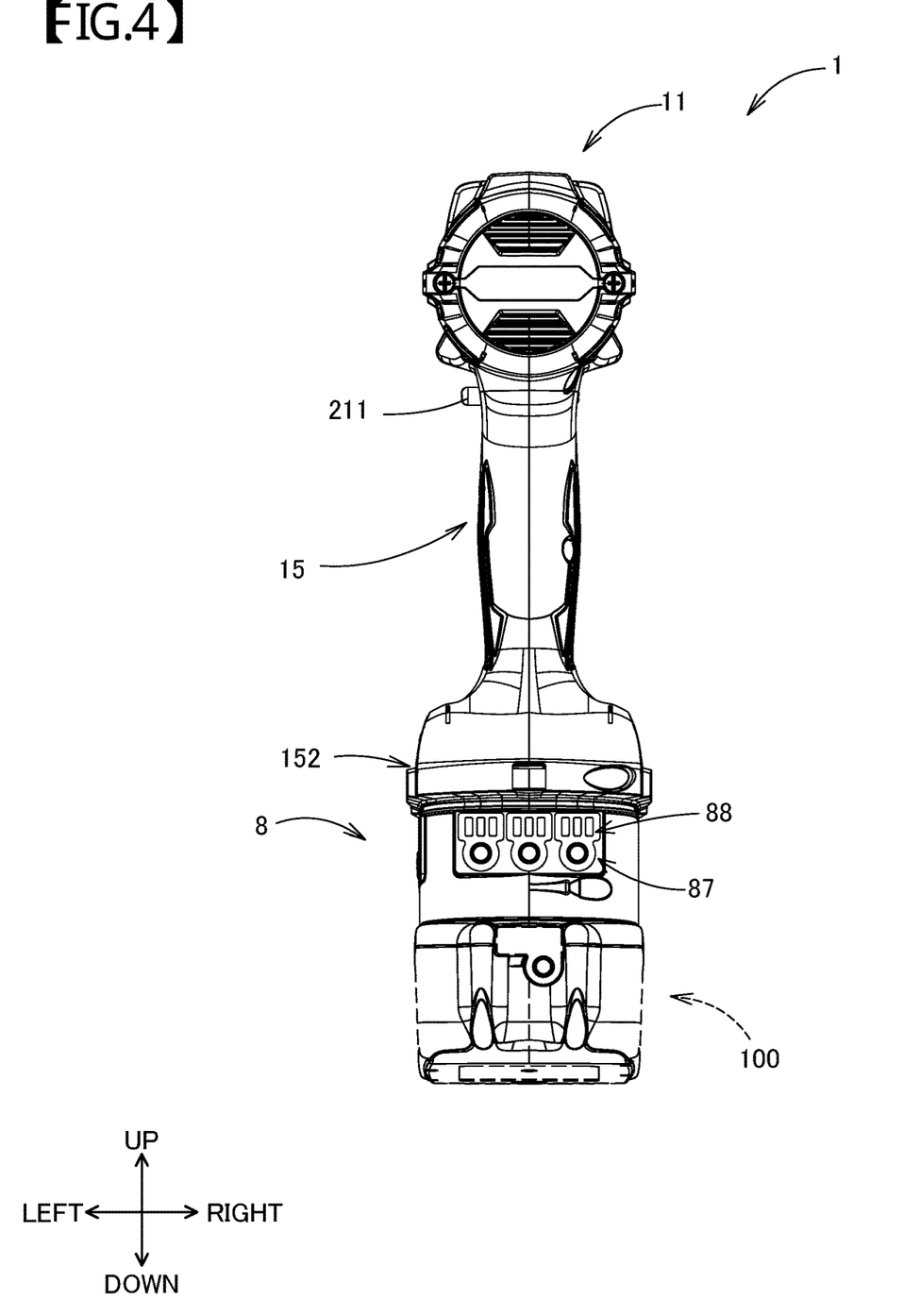
FIG. 4 is a back view of the driver drill with the adapter mounted thereto.

A chuck 37 protrudes along the driving axis A1 from one end of the body housing 11 in the extending direction of the driving axis A1 and is configured such that the tool accessory 200 is removably coupled thereto. The handle 15 is configured to be held by a user and protrudes from the body housing 11 in a direction crossing (substantially orthogonal to) the driving axis A1. A trigger 154 is provided in one end part (a first end part 151) of the handle 15 on the side connected to the body housing 11 and is configured to be depressed by a user. An adapter 8 is removably mounted to a protruding end part (a second end part 152) of the handle 15 via a battery mounting part 6. Further, a battery 100 is removably mounted to the driver drill 1 shown in FIG. 1 via the adapter 8. In FIGS. 2 to 4, the battery 100 is shown in broken line.

In the following description, for convenience sake, the extending direction of the driving axis A1 is defined as a front-rear direction of the driver drill 1. In the front-rear direction, the side on which the chuck 37 is arranged is defined as a front side and the opposite side is defined as a rear side. A direction orthogonal to the driving axis A1 and corresponding to the extending direction of the handle 15 is defined as an up-down direction. In the up-down direction, the first end part 151 side of the handle 15 is defined as an upper side, and the second end part 152 side of the handle 15 is defined as a lower side. Further, a direction orthogonal to the front-rear direction and the up-down direction is defined as a left-right direction.

The driver drill 1 has two action modes of a drill mode and a driver mode. The drill mode is an action mode for performing drilling operation on a workpiece by rotationally driving a drill bit that is one example of the tool accessory 200. The driver mode is an action mode for performing screw fastening operation by rotationally driving a driver bit that is another example of the tool accessory 200. As shown in FIG. 2, a mode change ring 17 is provided on a front end part of the body housing 11 and configured to be rotatable around the driving axis A1. A user can change the action mode of the driver drill 1 by turning the mode change ring 17.

The body housing 11 and structures of elements disposed therein are now described. As shown in FIG. 2, the body housing 11 houses the motor 2 as a driving source, and a driving mechanism 3 that is configured to drive the tool accessory 200 by power of the motor 2.

The motor 2 is driven by power supply from the battery pack 100 mounted to the battery mounting part 6. In this embodiment, a brushless DC motor is adopted as the motor 2. The motor 2 has a motor body 21 having a stator and a rotor, and a motor shaft 22 extending from the rotor and configured to rotate together with the rotor. The motor 2 is arranged within a rear end part of the body housing 11, and a rotational axis of the motor shaft 22 extends on the driving axis A1.

The driving mechanism 3 includes a spindle 35, the chuck 37, a planetary reduction gear 31 and a clutch mechanism 33.

The spindle 35 is arranged within a front end part of the body housing 11 and supported to be rotatable relative to the body housing 11 by a bearing. The spindle 35 corresponds to a non-limiting example of an "output shaft" according to this disclosure. An axis (rotational axis) of the spindle 35 extends on the driving axis A1. The chuck 37 is coaxially connected to the spindle 35 so as to rotate integrally with the spindle 35.

The planetary reduction gear 31 is configured as a reduction gear including a three-stage planetary gear mechanism and arranged in front of the motor 2 and behind the spindle 35. The planetary reduction gear 31 increases the torque inputted from the motor shaft 22 and outputs it to the spindle 35. The spindle 35 is then rotationally driven around the driving axis A1. A gear change lever 311 is provided on an upper surface of the body housing 11 and configured to be externally manipulated by a user. The gear change lever 311 is arranged to be movable in the front-rear direction and connected to a switching mechanism (not shown) of the planetary reduction gear 31. When the position of the gear change lever 311 is switched, the reduction ratio of the planetary reduction gear 31 (the rotation speed of the spindle 35) is changed via the switching mechanism The clutch mechanism 33 is in front of the planetary reduction gear 31. The clutch mechanism 33 is configured to interrupt torque transmission to the spindle 35 when the torque outputted from the planetary reduction gear 31 reaches a set value in the driver mode.

The handle 15 and structures of elements disposed therein are now described. As shown in FIG. 1, the handle 15 extends substantially in the up-down direction. The trigger 154 is provided in a front upper end part of the handle 15. A trigger switch 155 is housed within the handle 15. The trigger switch 155 is normally kept off and turned on in response to manually depressing operation of the trigger 154. The trigger switch 155 is configured to, when turned on, output a signal corresponding to the operation amount of the trigger 154 to a controller 5, which is housed in a lower end part of the handle 15, via wiring (not shown).

The controller 5 is mounted on a main substrate arranged within a case 50. In this embodiment, the controller 5 is configured as a microcomputer including a CPU and a memory. The controller 5 is configured to control various operations of the driver drill 1 such as drive control of the motor 2. The controller 5 is configured to stop energization to the motor 2 when receiving a prescribed signal (hereinafter referred to as a stop signal) from the adapter 8 during energization to the motor 2, which will be described in detail below.

In this embodiment, a lever 211 protrudes from right side surface and left side surface of the body housing 11. The lever 211 is a push-button type manipulation part that can be pushed in the left-right direction. The lever 211 is a manipulation part for switching the rotation of the tool accessory 200 (rotation of the motor shaft 22) between normal rotation and reverse rotation. The lever 211 is connected to the controller 5 via wiring (not shown), and the controller 5 switches the rotating direction of the motor 2 according to a signal inputted via the lever 211.

The battery mounting part 6 is provided on the second end part 152 of the handle 15. The battery mounting part 6 and the battery 100 to be removably mounted to the battery mounting part 6 are now described.

Figure 5:
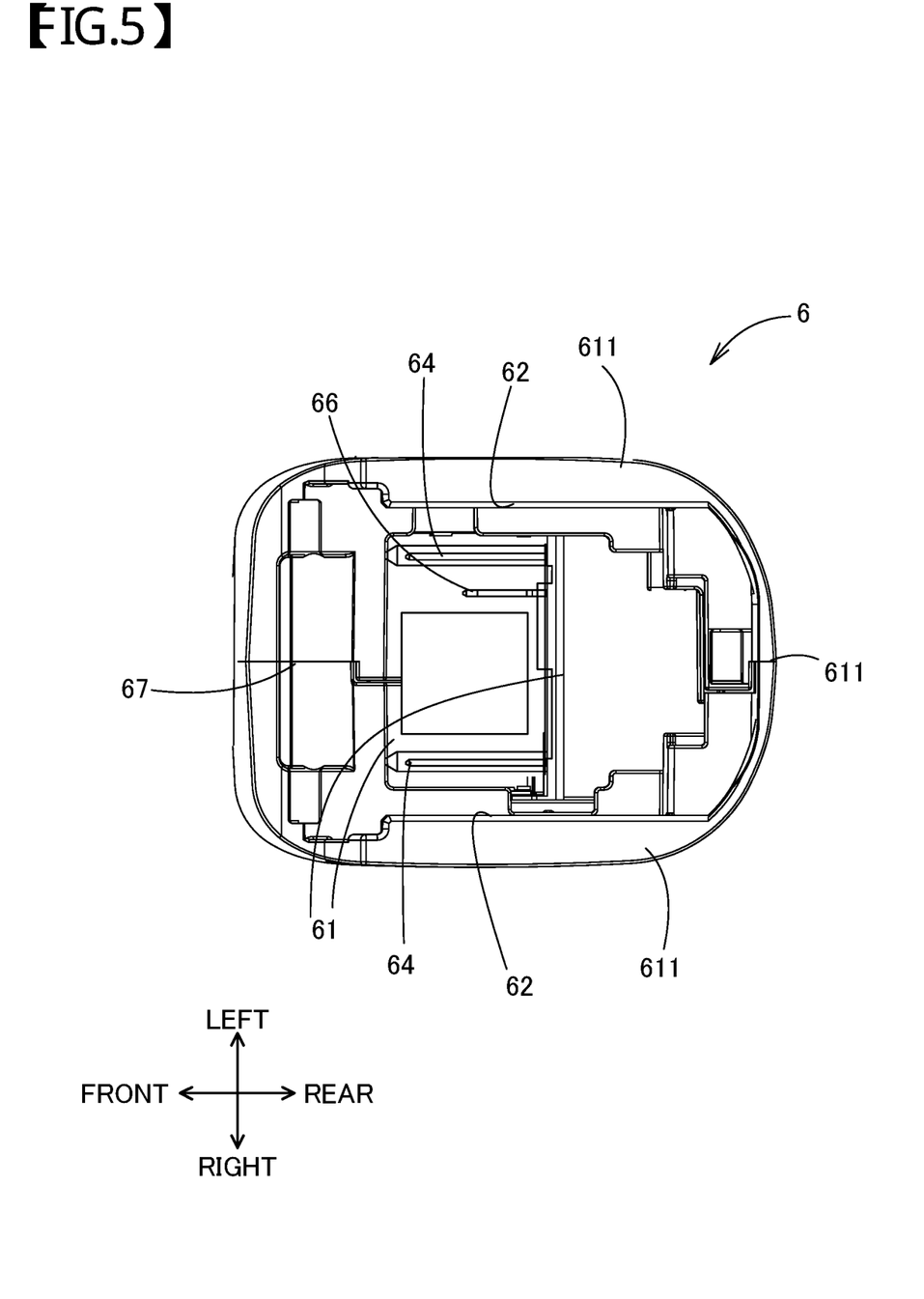
FIG. 5 is an underside view of a battery mounting part of the driver drill.
Figure 6:
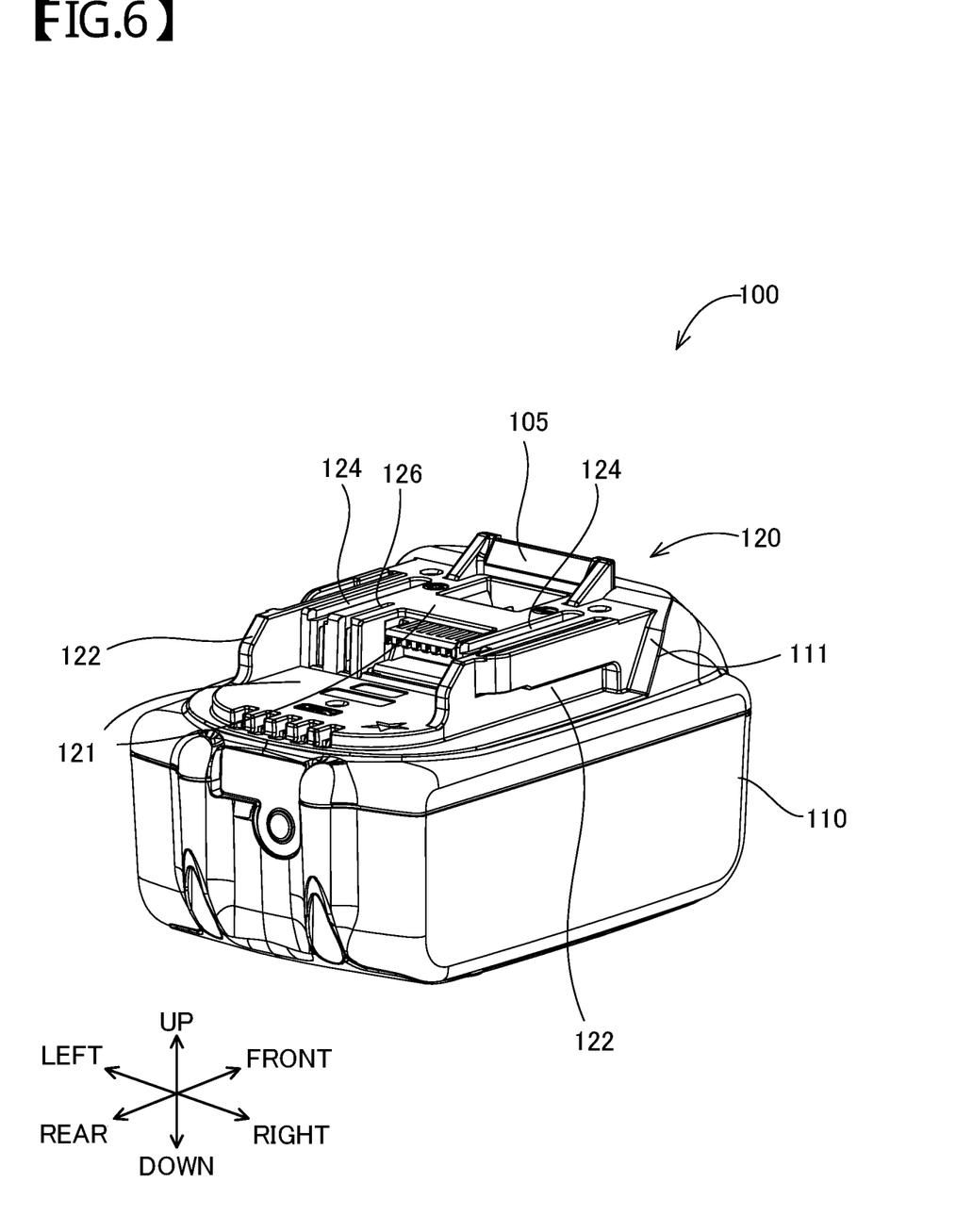
FIG. 6 is an external, perspective view of the battery.

The battery 100 shown in FIGS. 1 to 6 is a rechargeable battery pack having a known structure. In FIG. 6, the up-down direction, the left-right direction and the front-rear direction are shown with reference to the attitude of the battery 100 mounted to the battery mounting part 6. The battery 100 has a case 110 for housing a plurality of battery cells, and a mounting part 120 formed on a top of the case 110 and configured to be removably mounted to the battery mounting part 6. The mounting part 120 is configured to be removably mounted to a power tool that is operated by power supply from the battery 100, or to a charger.

The mounting part 120 has a mounting face (mounting surface) 121, a pair of rail receiving parts 122, a pair of power terminals 124 and a signal terminal 126. The mounting face 121 faces a mounting face (mounting surface) 61 (described in detail below) of the battery mounting part 6 when the battery 100 is mounted to the battery mounting part 6 of the driver drill 1. In this embodiment, the mounting face 121 is an upper surface of the case 110, including an upper surface of a part (a protruding part 111) protruding upward from a front upper part of the case 110. The mounting face 121 is substantially parallel to the front-rear direction and the left-right direction. Each of the rail receiving parts 122 is on the left side surface and right side surface of the protruding part 111 and extends in the front-rear direction.

The battery 100 is mounted/removed (slid) in the front-rear direction. The rail receiving parts 122 are configured to be engaged with guide rails 62 (described in detail below) of the battery mounting part 6.

The power terminals 124 include a positive power terminal and a negative power terminal. The power terminals 124 are terminals, for example, for supplying power from the battery 100 to the driver drill 1. The power terminals 124 are provided between the rail receiving parts 122. Further, the signal terminal 126 for transmitting and receiving signals to and from a charger and other power tools is provided between the power terminals 124. In this embodiment, the power terminals 124 and the signal terminal 126 are respectively arranged within slits formed in the protruding part 111.

The mounting part 120 further has a locking member 105 provided in a front upper part of the protruding part 111. The locking member 105 is biased upward by a spring that is disposed within the case 110 (within the protruding part 111) below the locking member 105. An unlock button 106 (see, for example, FIG. 1) is arranged on a front surface of the case 110, and the locking member 105 moves downward when the unlock button 106 is pressed downward.

As shown in FIG. 5, the battery mounting part 6 has a mounting face 61, a pair of guide rails 62, a pair of power terminals 64 and a signal terminal 66.

The battery mounting part 6 has a rectangular lid-like shape extending forward and in the width direction (the left-right direction) relative to the handle 15. In this embodiment, the battery mounting part 6 is shaped to receive the battery 100 from the front of the battery mounting part 6. The battery mounting part 6 has an underside surface (the mounting face 61) that has a rectangular lid-like shape and faces one surface (the mounting face 121) of the battery 100 when the battery 100 is mounted to the battery mounting part 6. The mounting face 61 is substantially parallel to the front-rear direction and the left-right direction. The mounting face 61 has wall parts 611 respectively formed on right and left ends and a rear end (on right and left sides and a rear side of the rectangular lid-like shape) and protruding downward. The guide rails 62 are respectively provided on the insides of the left and right wall parts 611 and extend in the front-rear direction. The guide rails 62 are configured to be engaged with the rail receiving parts 122 of the battery 100. The guide rails 62 guide the rail receiving parts 122 in the front-rear direction when the mounting part 120 of the battery 100 is mounted to the battery mounting part 6. The mounting face 61 is substantially parallel to the sliding direction of the battery 100.

The power terminals 64 are provided between the guide rails 62. Each of the power terminals 64 has a plate-like shape protruding downward from the mounting face 61 and extending in the front-rear direction. The power terminal 64 includes a positive power terminal and a negative power terminal. The power terminal 64 is configured to receive power from the battery 100 that is mounted to the battery mounting part 6 directly or via the adapter 8.

The signal terminal 66 is provided between the power terminals 64. The signal terminal 66 has a generally plate-like shape protruding downward from the mounting face 61 and extending in the front-rear direction. The signal terminal 66 is configured to transmit and receive signals to and from the battery 100 and the adapter 8 that are mounted to the battery mounting part 6.

When the mounting part 120 of the battery 100 is slid rearward from the front onto the battery mounting part 6, the rail receiving parts 122 of the battery 100 are engaged with the guide rails 62 of the battery mounting part 6, so that the battery 100 is mounted to the battery mounting part 6. At this time, the mounting face 61 of the battery mounting part 6 faces the mounting face 121 of the battery 100. Further, the power terminals 64 of the battery mounting part 6 are electrically connected to the power terminals 124 of the battery 100, respectively, and the signal terminal 66 of the battery mounting part 6 is electrically connected to the signal terminal 126 of the battery 100.

The battery mounting part 6 further includes a lock receiving hole 67 that is engaged with the locking member 105 of the battery 100. When the battery 100 is mounted to the battery mounting part 6, the locking member 105 is engaged with the lock receiving hole 67, and the battery 100 is locked to be immovable in the front-rear direction. When the unlock button 106 of the battery 100 is pressed in this locked state, the locking member 105 is disengaged or unlocked from the lock receiving hole 67. In the unlocked state, the battery 100 is removed from the battery mounting part 6 when slid frontward relative to the battery mounting part 6.

The adapter 8 is now described with reference to FIGS. 2 and 7 to 11. The adapter 8 has a housing 84 that houses a detection part 89, a first mounting part 81 that is formed on the housing 84 and configured to be removably mounted to the battery mounting part 6, and a second mounting part 82 that is formed on the housing 84 and configured such that the battery 100 can be removably mounted thereto. In this embodiment, the second mounting part 82 is provided on the housing 84 on the side opposite to the first mounting part 81.

Figure 7:
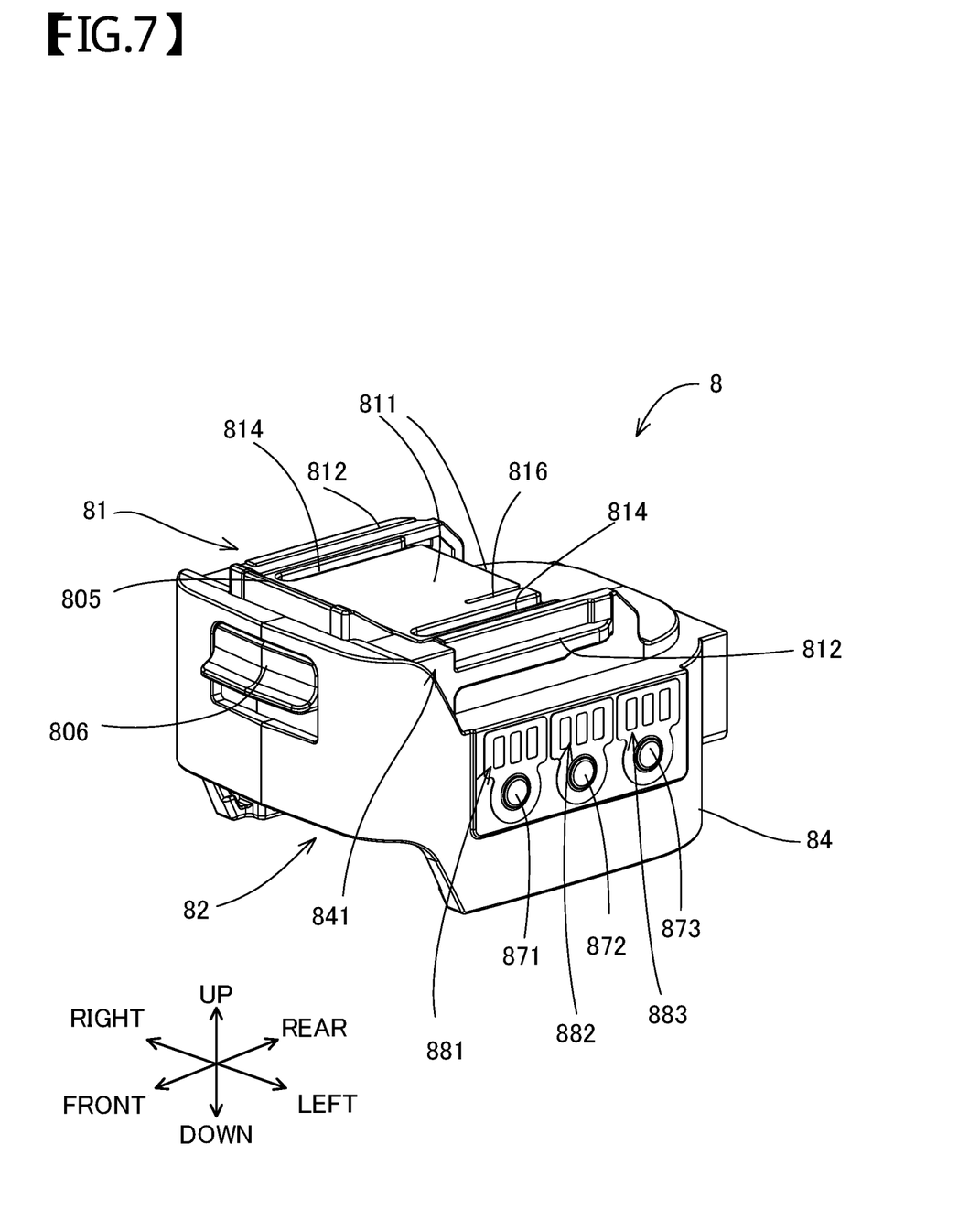
FIG. 7 is an external, perspective view of the adapter.
Figure 9:
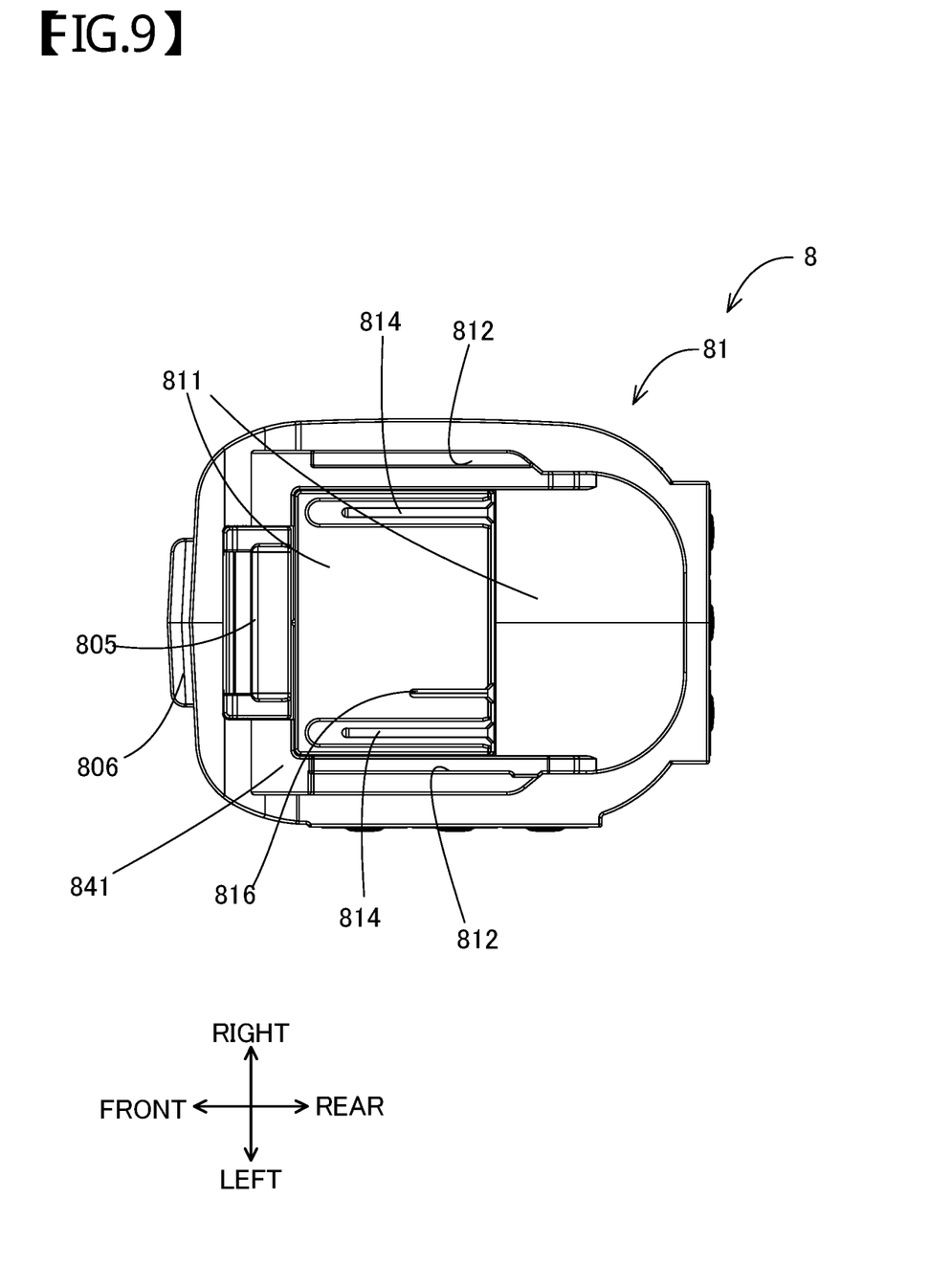
FIG. 9 is a top view of the adapter, for illustrating a first mounting part of the adapter.

The first mounting part 81 has a mounting face (mounting surface) 811 that faces the mounting face 61 of the battery mounting part 6 when the adapter 8 is mounted to the battery mounting part 6. In the following description of the directions of the adapter 8, a direction orthogonal to the mounting face 811 and a direction parallel to the mounting face 811 and corresponding to the sliding direction of the adapter 8 are also referred to as a first direction and a second direction, respectively, and a direction orthogonal to the first and second directions is referred to as a third direction.

In this embodiment, the first, second and third directions respectively correspond to the up-down direction, the front-rear direction and the left-right direction in the driver drill 1 when the adapter 8 is mounted to the battery mounting part 6 of the driver drill 1. In FIGS. 7 to 11, the directions of the adapter 8 mounted to the battery mounting part 6 are shown.

The housing 84 of the adapter 8 has a generally box-like shape having substantially the same lengths in the front-rear direction and the left-right direction as the battery mounting part 6. A protruding part 841 is formed on a front upper part of the housing 84 and protrudes upward.

The first mounting part 81 is configured substantially similarly to the mounting part 120 of the battery 100. The first mounting part 81 can be mounted not only to the driver drill 1, but to other power tools having the battery mounting part 6.

The first mounting part 81 has the mounting face 811, a pair of rail receiving parts 812, a pair of power terminals 814 and a signal terminal 816. The mounting face 811 is an upper surface of the housing 84, including an upper surface of the protruding part 841. The mounting face 811 faces the mounting face 61 of the battery mounting part 6 when the adapter 8 is mounted to the battery mounting part 6. The mounting face 811 is substantially parallel to the front-rear direction and the left-right direction. Each of the rail receiving parts 812 is formed on the left side surface and right side surface of the protruding part 841 and extends in the front-rear direction. The rail receiving parts 812 are configured to be engaged with the guide rails 62 of the battery mounting part 6. The rail receiving parts 812 are guided by the guide rails 62 of the battery mounting part 6 in the front-rear direction when the first mounting part 81 of the adapter 8 is mounted to the battery mounting part 6 of the driver drill 1. The mounting face 811 is substantially parallel to the sliding direction of the adapter 8.

The power terminals 814 include a positive power terminal and a negative power terminal. The power terminals 814 are provided between the rail receiving parts 812. Further, the signal terminal 816 for transmitting and receiving signals to and from the driver drill 1 and other rotary tools having the adapter 8 mounted thereto is provided between the power terminals 814. The power terminals 814 and the signal terminal 816 are respectively arranged within slits formed in the protruding part 841.

The adapter 8 is mounted and removed to and from the battery mounting part 6 of the driver drill 1 in the same manner as the manner in which the battery 10 is mounted and removed to and from the battery mounting part 6. Specifically, when the adapter 8 is slid rearward from the front onto the battery mounting part 6, the rail receiving parts 812 of the first mounting part 81 are engaged with the guide rails 62 of the battery mounting part 6. At this time, the power terminals 814 of the adapter 8 are electrically connected to the power terminals 64 of the battery mounting part 6, respectively, and the signal terminal 816 of the adapter 8 is electrically connected to the signal terminal 66 of the battery mounting part 6.

The first mounting part 81 further has a locking member 805 provided in a front upper part of the protruding part 841. The locking member 805 is biased upward by a spring that is disposed within the housing 84 (within the protruding part 841) below the locking member 805. An unlock button 806 is arranged on a front surface of the housing 84, and the locking member 805 moves downward when the unlock button 806 is pressed downward. When the adapter 8 (the first mounting part 81) is mounted to the battery mounting part 6, the locking member 805 is engaged with the lock receiving hole 67 of the battery mounting part 6, and the adapter 8 is locked. When the unlock button 806 is pressed by a user in this locked state, the locking member 805 is disengaged or unlocked from the lock receiving hole 67. In the unlocked state, the adapter 8 is removed from the battery mounting part 6 when slid frontward relative to the battery mounting part 6.

Figure 10:
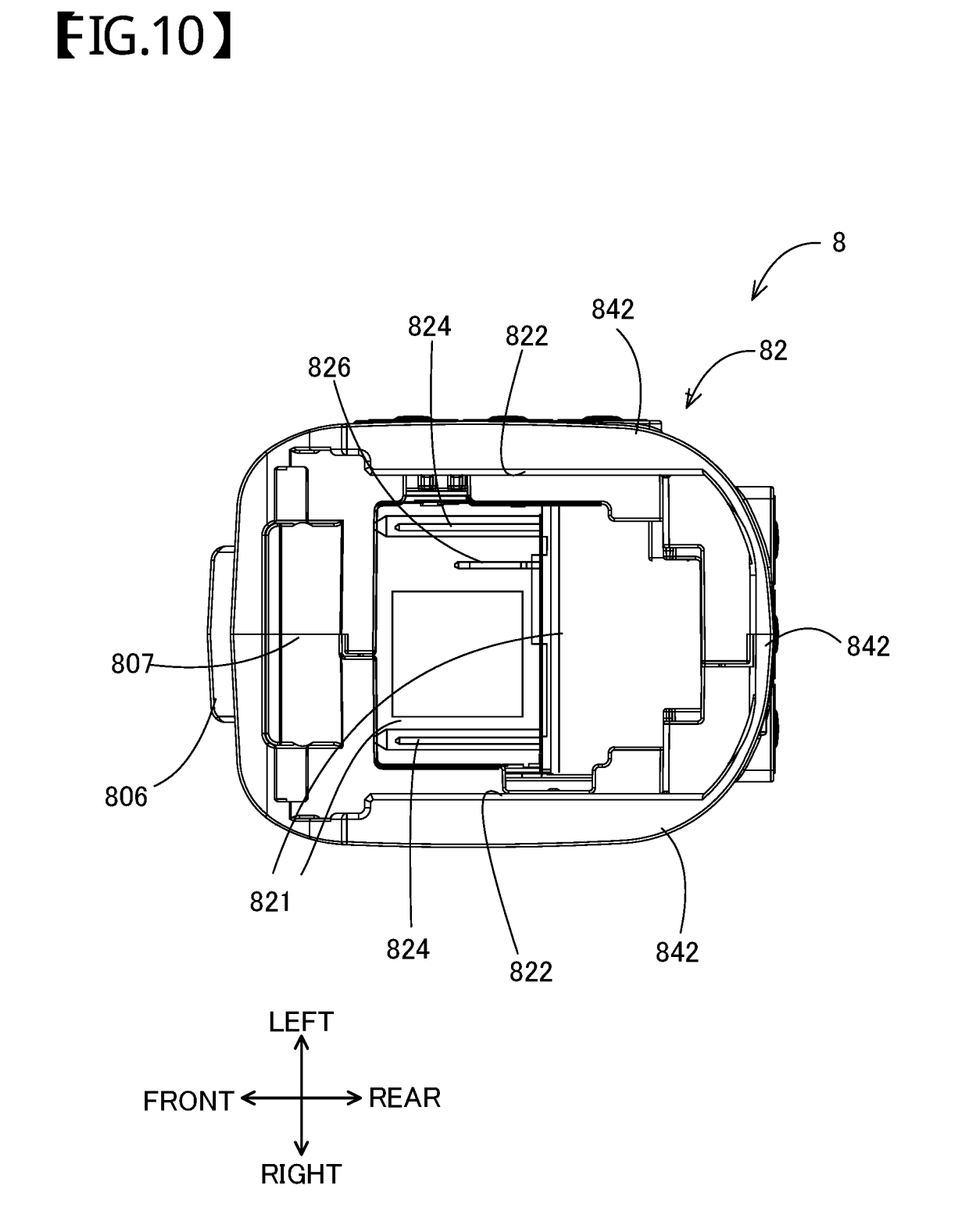
FIG. 10 is a bottom view of the adapter, for illustrating a second mounting part of the adapter.

The second mounting part 82 is configured substantially similarly to the battery mounting part 6 of the driver drill 1. The second mounting part 82 is configured such that the battery 100 is removably mounted thereto.

The second mounting part 82 is described with reference to FIG. 10. The second mounting part 82 has a mounting face (mounting surface) 821 that faces the mounting face 121 of the battery 100 when the battery 100 is mounted, a pair of guide rails 822, a pair of power terminals 824 and a signal terminal 826.

Figure 8:
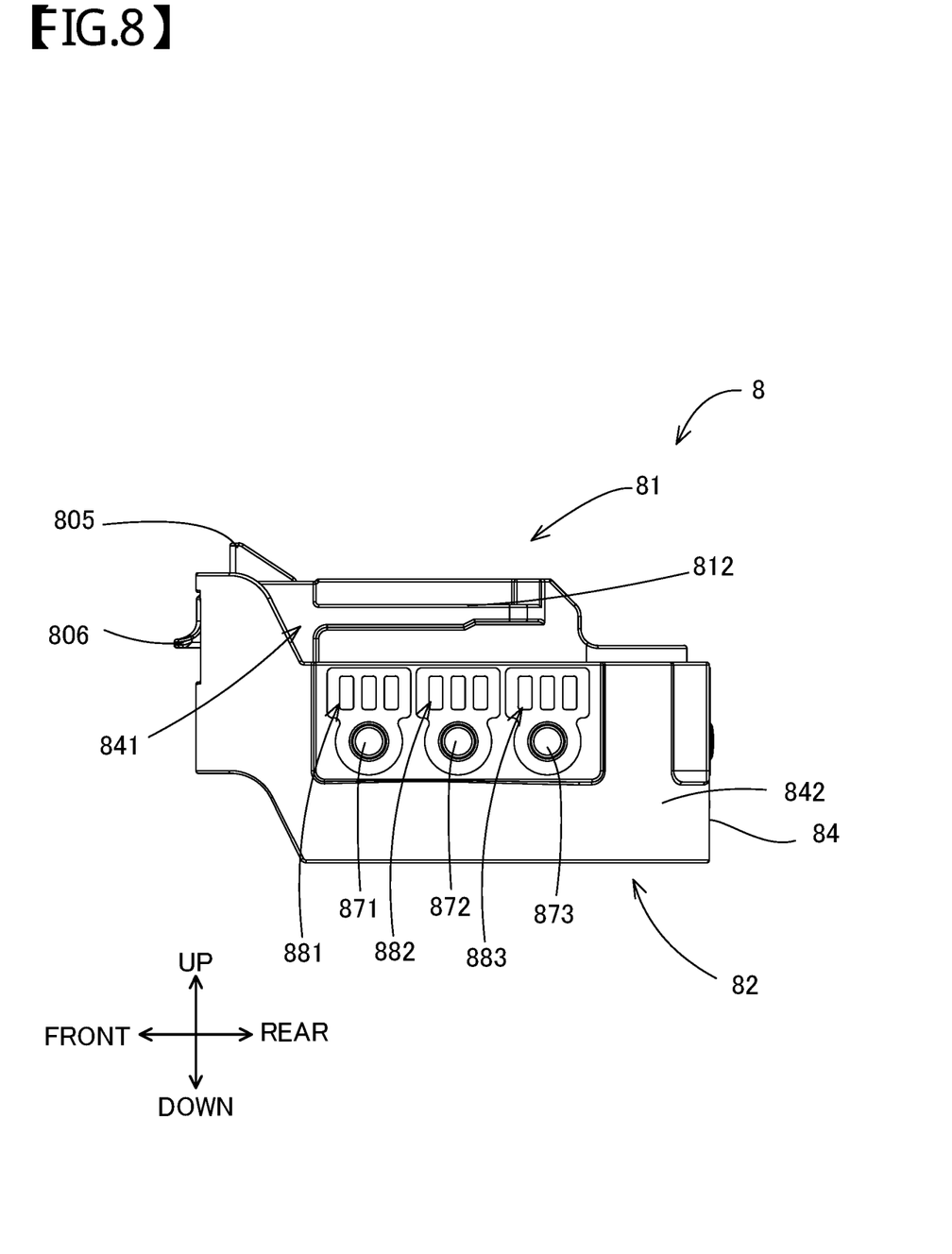
FIG. 8 is a side view of the adapter.

In this embodiment, as shown in FIG. 8, a front lower part of a side wall (a wall part 842) of the housing 84 is notched such that the battery 100 can be removably mounted from the front onto the second mounting part 82 as well as the battery mounting part 6. The mounting face 821 has wall parts 842 respectively formed on right and left ends and a rear end and extending in the up-down direction. The guide rails 822 are respectively provided on the insides of the left wall part 842 and right wall part 842 and extend in the front-rear direction. The guide rails 822 are configured to be engaged with the rail receiving parts 122 of the battery 100. The guide rails 822 guide the rail receiving parts 122 of the battery 100 in the front-rear direction when the mounting part 120 of the battery 100 is mounted to the second mounting part 82. The mounting face 821 of the second mounting part 82 is substantially parallel to the front-rear direction and the left-right direction, and substantially parallel to the mounting face 811 of the first mounting part 81. The guide rails 822 of the second mounting part 82 is substantially parallel to the rail receiving parts 812 of the first mounting part 81.

The power terminals 824 are provided between the guide rails 822 and has a plate-like shape extending in the front-rear direction. The power terminals 824 include a positive power terminal and a negative power terminal. The signal terminal 826 is provided between the power terminals 64 and has a generally plate-like shape extending in the front-rear direction. The adapter 8 of this embodiment is configured such that the power terminals 824 of the second mounting part 82 are electrically connected to the power terminals 814 of the first mounting part 81, respectively, and the signal terminal 826 of the second mounting part 82 is electrically connected to the signal terminal 816 of the first mounting part 81.

When the battery 100 is slid rearward from the front onto the second mounting part 82, the rail receiving parts 122 of the battery 100 are engaged with the guide rails 822 of the second mounting part 82, so that the battery 100 is mounted to the second mounting part 82. When the battery 100 is mounted to the second mounting part 82 with the adapter 8 mounted to the driver drill 1, the power terminals 124 of the battery 100, the power terminals 824, 814 of the adapter 8 and the power terminals 64 of the battery mounting part 6 are electrically connected, so that power of the battery 100 can be supplied to the adapter 8 and the driver drill 1. Further, the signal terminal 126 of the battery 100, the signal terminals 826, 816 of the adapter 8 and the signal terminal 66 of the battery mounting part 6 are electrically connected, so that signals can be transmitted, for example, from the adapter 8 to the driver drill 1.

The second mounting part 82 further includes a lock receiving hole 807 that is engaged with the locking member 105 of the battery 100. When the battery 100 is mounted to the second mounting part 82, the locking member 105 is engaged with the lock receiving hole 807, and the battery 100 is locked to be immovable in the front-rear direction. When the unlock button 106 of the battery 100 is pressed in this locked state, the locking member 105 is disengaged or unlocked from the lock receiving hole 807. In the unlocked state, the battery 100 is removed from the second mounting part 82 when slid frontward relative to the second mounting part 82.

As shown in FIG. 2, the housing 84 of the adapter 8 houses a controller 86 and a detection part 89. The controller 86 and the detection part 89 are mounted on a substrate arranged within a case 85.

The detection part 89 is configured to detect the moving state of the adapter 8 in a prescribed direction. In this embodiment, the detection part 89 is configured to detect the moving state of the adapter 8 independently in each of the first, second and third directions. As described above, the first direction is a direction perpendicular (orthogonal) to the mounting face 811, and the second direction is a direction orthogonal to the first direction and a direction parallel to the mounting face 811 and corresponding to the sliding direction of the adapter 8. The third direction is a direction orthogonal to the first and second directions and a direction parallel to the mounting face 811 and orthogonal to the second direction. In this embodiment, the detection part 89 is an acceleration sensor capable of detecting acceleration in three directions (directions of three axes), and detects acceleration in each of the three directions as an index of the moving state of the adapter 8. When the adapter 8 is mounted to the driver drill 1, the detection part 89 detects acceleration of the adapter 8 in each of the three directions and thereby also detects acceleration of the driver drill 1 integrated with the adapter 8, in each of the three directions (the up-down direction, the front-rear direction and the left-right direction).

Figure 11:
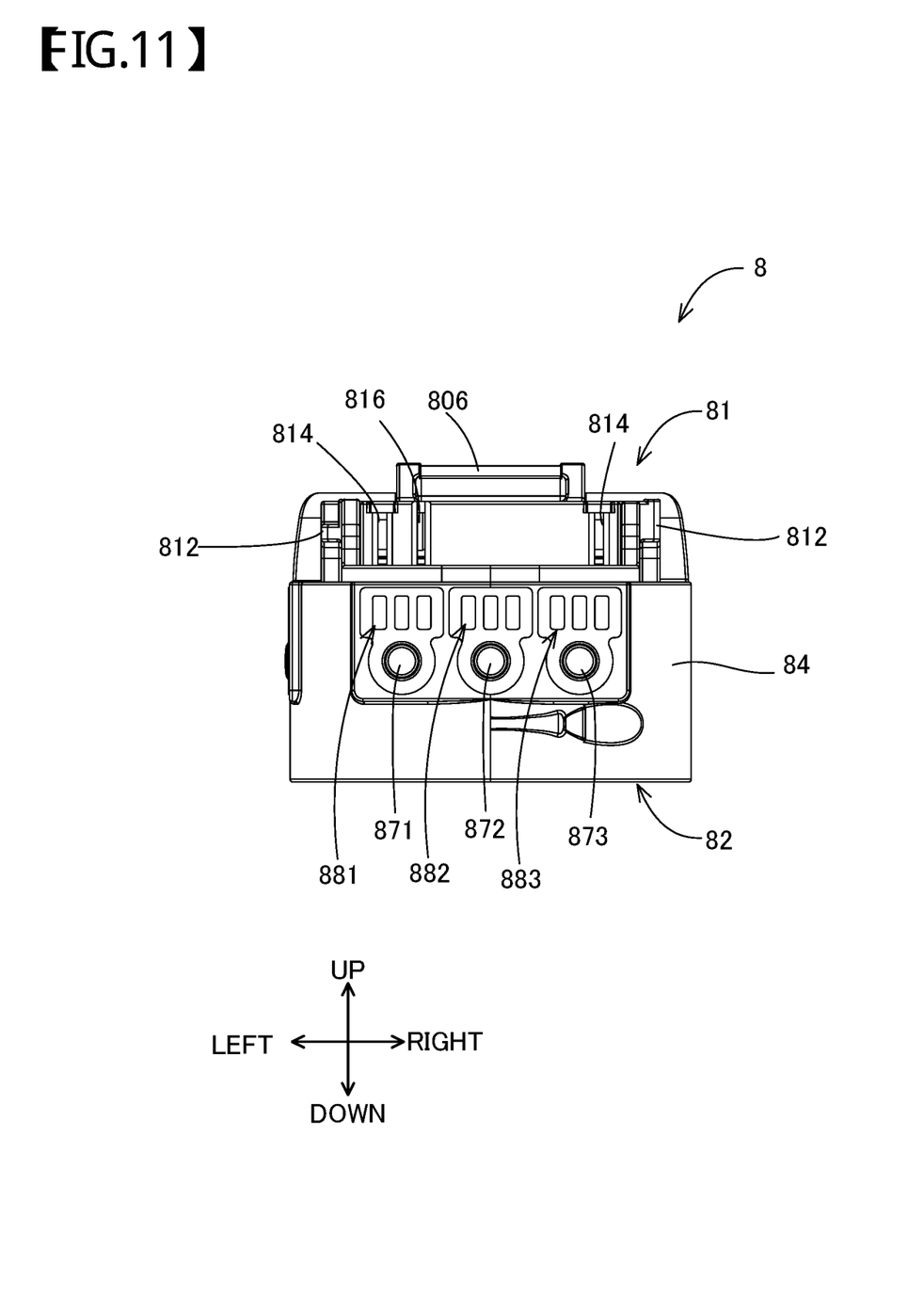
FIG. 11 is a back view of the adapter.

A manipulation part 87 (871, 872, 873) is provided on the adapter 8 and configured to be externally manipulated by a user. The manipulation part 87 is electrically connected to the detection part 89 and configured to output a signal corresponding to the manually operation of the user to the detection part 89. The detection part 89 is configured such that the detection sensitivity can be changed (adjusted) according to the manually operation of the manipulation part 87. In this embodiment, the manipulation parts 871, 872, 873 are button switches. The detection sensitivity of the detection part 89 in each of the first direction (the up-down direction), the second direction (the front-rear direction) and the third direction (the left-right direction) is adjusted by user's manually operation of the manipulation parts 871, 872, 873, respectively. For example, when the manipulation part 873 is pressed, the detection sensitivity of the detection part 89 in the left-right direction is increased. The detection sensitivity of the detection part 89 is adjusted according to the number of times of pressing the manipulation part 87. For example, the detection sensitivity can be changed stepwise from level 0 (no sensitivity) to level 1 (low sensitivity), level 2 (middle sensitivity) and level 3 (high sensitivity). The detection sensitivity is adjusted, for example, by a signal from a detection element of the detection part 89 being amplified or attenuated according to operation signals of the manipulation parts 871, 872, 873.

A display part 88 (881, 882, 883) are provided above the manipulation parts 871, 872, 873. Each of the display parts 881, 882, 883 includes a plurality of LED lights. The display parts 881, 882, 883 are configured such that the number of the lights to be lit increases according to the number of times of pressing the manipulation parts 871, 872, 873. In this embodiment, the manipulation parts 871, 872, 873 and the display parts 881, 882, 883 are arranged on a left wall and a rear wall of the housing 84.

The controller 86 of the adapter 8 is configured as a microcomputer including a CPU and a memory. A predetermined threshold (threshold value) is stored in the controller 86 of the adapter 8.

If the tool accessory 200 is locked during operation of the driver drill 1, excessive reaction torque may act on the driver drill 1 and cause the driver drill 1 to be excessively rotated around the driving axis A1 (this phenomenon is also called kickback). Excessive rotation of the driver drill 1 around the driving axis A1 can be caused not only by kickback but by the tool accessory 200 being rotated in a direction opposite to a direction expected by a user, for example, by erroneous operation of the lever 211, in a screw fastening operation. It is because a user may hold the driver drill 1 so as to counter the rotation in the expected direction in a screw fastening operation. The threshold is determined based on a value that is to be detected by the detection part 89 in the event of occurrence of excessive rotation around the driving axis in the driver drill 1 or other rotary tools. The threshold is obtained in advance by experiments or simulation. If the detected value exceeds the threshold, the possibility of occurrence of excessive rotation is high.

In this embodiment, the spindle 35 of the driver drill 1 extends in the front-rear direction within the body housing 11 and an axis (the driving axis A1) of the spindle 35 extends in the front-rear direction. Further, the battery mounting part 6 is provided on the second end part 152 of the handle 15 that is connected to the body housing 11 and extends in the up-down direction. When the adapter 8 is mounted to the battery mounting part 6, the underside surface (the mounting face 61) of the battery mounting part 6 faces the upper surface (the mounting face 811) of the first mounting part 81 of the adapter 8. With this configuration, the acceleration of the adapter 8 in the left-right direction is increased if kickback occurs during operation of the driver drill 1. Therefore, occurrence of kickback of the driver drill 1 can be detected by detecting the acceleration of the adapter 8 in the left-right direction (the third direction) and comparing the detected value with the threshold.

When the detected value outputted from the detection part 89 exceeds the threshold, the controller 86 of the adapter 8 transmits a stop signal to the driver drill 1 via the signal terminal 816 provided on the first mounting part 81 of the adapter 8 and the signal terminal 66 provided on the battery mounting part 6 of the driver drill 1. Upon receiving the stop signal from the adapter 8 during energization to the motor 2, the controller 5 of the driver drill 1 stops energization to the motor 2. In this manner, energization to the motor 2 is stopped in the event of occurrence of kickback in the driver drill 1.

Effects of the adapter 8 and the driver drill 1 with the adapter 8 mounted thereto are now described.

The adapter 8 has the first mounting part 81 configured to be removably mounted to the battery mounting part 6, the second mounting part 82 configured such that the battery 100 can be removably mounted thereto, and the detection part 89 configured to detect the moving state of the adapter 8. Therefore, even if the driver drill 1 does not have a function of detecting its moving state, the moving state of the driver drill 1 can be detected by provision of the adapter 8, or specifically, by mounting the first mounting part 81 of the adapter 8 to the battery mounting part 6 of the driver drill 1 and mounting the battery 100 to the second mounting part 82 of the adapter 8. Further, the adapter 8, which is configured to be removably mounted to the battery mounting part 6, can be removably mounted not only to the driver drill 1 but also to various kinds of rotary tools configured such that the battery 100 can be removably mounted thereto. Therefore, the moving state of various kinds of such rotary tools can be obtained by provision of the adapter 8.

The handle 15 of the driver drill 1 extends from the body housing 11 that houses the spindle 35, in the up-down direction substantially orthogonal to the driving axis A1, and the battery mounting part 6 is provided on the second end part 152 of the handle 15. Thus, the battery mounting part 6 is arranged relatively apart from the driving axis A1 in the driver drill 1. Therefore, the rotating state of the driver drill 1 around the driving axis A1 can be detected accurately, compared with a structure in which the battery mounting part 6 is arranged relatively close to the driving axis A1.

Further, when the adapter 8 is mounted to the battery mounting part 6 provided on the second end part 152 of the handle 15 and the battery 100 is mounted to the adapter 8, the mass of the second end part 152 side (the lower side as viewed in FIG. 1) of the handle 15 is increased. Thus, the inertial moment of the driver drill 1 around the driving axis A1 is increased, which makes it difficult for the driver drill 1 to rotate around the driving axis A1. Therefore, the driver drill 1 with the adapter 8 mounted thereto is advantageous in that the possibility of occurrence of kickback can be reduced.

In the adapter 8, the second mounting part 82 is provided on a side opposite to the first mounting part 81 on the housing 84. Thus, the battery mounting part 6 of the driver drill 1, the adapter 8 and the battery 100 are arranged in this order in the extending direction of the handle 15, so that the driver drill 1 can be formed with slim appearance in a region from the battery mounting part 6 of the driver drill 1 to the adapter 8 and the battery 100. Therefore, the designability of the driver drill 1 with the adapter 8 and the battery 100 mounted thereto can be improved. Further, the adapter 8 and the battery 100 are prevented from disturbing user's operation of the driver drill 1.

The controller 86 of the adapter 8 is configured to output a stop signal to the controller 5 of the driver drill 1 via the signal terminal 816 when the acceleration outputted from the detection part 89 exceeds the threshold, and the controller 5 of the driver drill 1 is configured to stop energization to the motor 2 when receiving the stop signal. Therefore, with the adapter 8 of this embodiment, the safety of the driver drill 1 can be enhanced.

The detection part 89 of the adapter 8 is configured to detect acceleration in each of the three directions (the first, second and third directions) orthogonal to each other. Therefore, in other rotary tools to which the adapter 8 can be mounted, the rotating state of the rotary tools around the driving axis can also be detected based on the acceleration in at least one of the first to third directions that corresponds to a direction around the driving axis, according to the arrangement relation between the extending direction of the driving axis and the battery mounting part. Therefore, occurrence of kickback can also be detected in other rotary tools that are different from the driver drill 1 in the extending direction of the driving axis A1 or in the position of arrangement of the battery mounting part 6 relative to the extending direction of the driving axis A1.

The adapter 8 has the manipulation parts 871, 872, 873 configured such that the detection sensitivity of the detection part 89 can be adjusted according to an external manipulation of a user, so that the user can adjust the detection sensitivity of the moving state of the adapter 8 to a desired level. For example, the user operates the manipulation part 873 to increase the detection sensitivity in a direction around the driving axis A1 of the driver drill 1 (the left-right direction) and operates the manipulation parts 871, 872 to reduce the detection sensitivity in the other directions (the up-down direction, the front-rear direction), so that the acceleration in a direction related to kickback can be detected accurately in the adapter 8. Thus, the safety of the driver drill 1 can be further enhanced.

Relating to the manipulation parts 871, 872, 873, as for a user whose force opposing excessive rotation around the driving axis A1 of the driver drill 1 is relatively large, the possibility that the detected value exceeds the threshold can be reduced by manipulating the manipulation part 873 to reduce the detection sensitivity in the left-right direction. Thus, the possibility of unintended stop of the motor 2 can be reduced, so that the convenience of use of the driver drill 1 can be improved.

Even where the adapter 8 is mounted to other rotary tools different in the arrangement relationship between the extending direction of the driving axis and the battery mounting part, the detection sensitivity in a direction corresponding to the direction around the driving axis can also be increased by manipulating the manipulation parts 871, 872, 873 according to the structures of the other rotary tools. Therefore, kickback of various kinds of rotary tools can be accurately detected by provision of the adapter 8.

Further, in this embodiment, the manipulation parts 871, 872, 873 are provided on the left wall and the rear wall of the housing 84. Therefore, the user can select either the manipulation parts 871, 872, 873 on the left wall or the manipulation parts 871, 872, 873 on the rear wall, which are easier to manipulate, for example, according to the arrangement position of the battery mounting part in the rotary tool. Therefore, ease of operation of the rotary tool with the adapter 8 mounted thereto can be improved.

Other Embodiments

The detection part 89 may be configured to detect the rotating state around the driving axis A1 based on not the acceleration but other physical quantities (e.g., displacement amount, speed, angular acceleration). The detection part 89 may be, for example, a gyro sensor.

The detection part 89 may just be capable of detecting the moving state of the adapter 8 in at least one direction, and for example, it may be configured to detect the moving state of the adapter 8 in one direction. This configuration is also advantageous in that the moving state of the adapter 8 in one direction can be detected by the adapter 8 being mounted to the rotary tool not having the detection part 89. The above-described at least one direction preferably includes a direction orthogonal to the driving axis A1 in the rotary tool having the adapter 8 mounted thereto. With this configuration, the rotating state of the rotary tool around the driving axis A1 can be detected by provision of the adapter 8.

The controller 86 of the adapter 8 may be configured to stop energization to the driver drill 1 or other rotary tools when the detected value of the detection part 89 exceeds the threshold. With this configuration, the motor 2 is also stopped in the event of occurrence of kickback, so that the safety of the driver drill 1 or other rotary tools can be enhanced. With the configuration of the adapter 8, the motor 2 can be stopped upon occurrence of kickback of the driver drill 1 or other rotary tools. Therefore, the adapter 8 can be advantageously applied to a wider variety of rotary tools.

The threshold for detecting kickback may be stored in the controller 5 of the driver drill 1, and the adapter 8 may be configured to transmit the detected value of the detection part 89 to the driver drill 1. The controller 5 of the driver drill 1 may be configured to stop energization to the motor 2 when the detected value exceeds the threshold. In this case, the adapter 8 need not have the controller 86. With this configuration, the safety of the driver drill 1 can also be enhanced.

The threshold stored in the controller 86 of the adapter 8 may be changed according to the manually operation signal of the manipulation part 87 in order to adjust the detection sensitivity of the detection part 89. With this configuration, the user can also adjust the detection sensitivity of the moving state of the adapter 8 to a desired level, so that the same effect as the above-described embodiment can be obtained.

Further, in view of the nature of the present disclosure and the above-described embodiment, the following aspects can be provided. At least one of the following aspects can be adopted in combination with at least one of the above-described embodiment and its modifications or the claimed invention.

(Aspect 1) The first mounting part has a mounting face,
the mounting face faces a prescribed surface of the battery mounting part when the adapter is mounted to the battery mounting part,
the at least one direction in which the detection part detects includes a first direction, a second direction and a third direction, and
the first direction is orthogonal to the mounting face, the second direction is parallel to the mounting face and orthogonal to the first direction, and the third direction is orthogonal to the first and second directions.

(Aspect 2) The first mounting part is configured to be removably mounted to the battery mounting part in the second direction.

(Aspect 3) The first mounting part includes the mounting face, a pair of rails extending in the second direction, a pair of power terminals provided on the mounting face, and a signal terminal provided on the mounting face.

(Aspect 4) A rotary tool, comprising:
a battery mounting part that is configured such that a battery can be removably mounted thereto,
a motor that is configured to be driven by power supply from the battery mounted to the battery mounting part,
an output shaft that is configured to be rotationally driven by the motor, and
an adapter removably mounted to the battery mounting part,
wherein:
the at least one direction includes a direction orthogonal to an axis of the output shaft.

DESCRIPTION OF THE REFERENCE NUMERALS

1: driver drill, 11: body housing, 15: handle, 151: first end part, 152: second end part, 154: trigger, 155: trigger switch, 17: mode change ring, 2: motor, 21: motor body, 22: motor shaft, 3: driving mechanism, 31: planetary reduction gear, 33: clutch mechanism, 35: spindle, 37: chuck, 211: lever, 311: gear change lever, 5: controller, 50: case, 6: battery mounting part, 61: mounting face, 611: wall part, 62: guide rail, 64: power terminal, 66: signal terminal, 67: lock receiving hole, 200: tool accessory, 8: adapter, 81: first mounting part, 805: locking member, 806: unlock button, 811: mounting face, 812: rail receiving part, 814: power terminal, 816: signal terminal, 82: second mounting part, 807: lock receiving hole, 821: mounting face, 822: guide rail, 824: power terminal, 826: signal terminal, 84: housing, 841: protruding part, 842: wall part, 85: case, 86: controller, 87, 871, 872, 873: manipulation part, 88, 881, 882, 883: display part, 89: detection part, 100: battery, 105: locking member, 106: unlock button, 110: case, 111: protruding part, 120: mounting part, 121: mounting face, 122: rail receiving part, 124: power terminal, 126: signal terminal, A1: driving gear

The invention claimed is:

1. An adapter that is configured to be removably mounted to a rotary tool, the rotary tool having a battery mounting part configured such that a battery can be removably mounted thereto, and an output shaft that is rotationally driven by power supplied from the battery mounted to the battery mounting part, comprising:
a housing;
a first mounting part that is on the housing and configured to be removably mounted to the battery mounting part;
a second mounting part that is on the housing and configured such that the battery can be removably mounted thereto;

a detection part that is configured to detect a moving state of the adapter in at least one direction; and
a manipulation part that is configured to be externally manipulated by a user, wherein
detection sensitivity of the detection part for detecting the moving state of the adapter in the at least one direction is adjusted according to manipulation of the manipulation part.

2. The adapter as defined in claim 1, wherein the second mounting part is on a side opposite to the first mounting part on the housing.

3. The adapter as defined in claim 2, wherein:
the at least one direction includes a plurality of directions, and
the detection part is configured to detect the moving state of the adapter in each of the directions.

4. The adapter as defined in claim 1, wherein:
the at least one direction includes a plurality of directions, and
the detection part is configured to detect the moving state of the adapter in each of the directions.

5. The adapter as defined in claim 4, wherein:
the first mounting part has a mounting face,
the mounting face faces a prescribed surface of the battery mounting part when the adapter is mounted to the battery mounting part,
the at least one direction includes a first direction, a second direction and a third direction, and
the first direction is orthogonal to the mounting face, the second direction is parallel to the mounting face and orthogonal to the first direction, and the third direction is orthogonal to the first and second directions.

6. A rotary tool, comprising:
a battery mounting part configured such that a battery can be removably mounted thereto;
a motor that is configured to be driven by power supply from the battery mounted to the battery mounting part;
an output shaft that is configured to be rotationally driven by the motor; and
an adapter as defined in claim 1 and removably mounted to the battery mounting part.

7. The rotary tool as defined in claim 6, further comprising:
a body housing that houses the motor and at least part of the output shaft; and
a handle that extends in a crossing direction that crosses an axis of the output shaft and has a first end part that is connected to the body housing and a second end part on a side opposite to the first end part in the crossing direction,
wherein:
the battery mounting part is on the second end part of the handle.

8. The rotary tool as defined in claim 6, further comprising:
a controller,
wherein:
the adapter is configured to transmit a signal to the rotary tool when the moving state detected by the detection part is a predetermined state corresponding to excessive rotation of the rotary tool, and
the controller is configured to stop energization to the motor according to the signal from the adapter.

9. The rotary tool as defined in claim 6, wherein the rotary tool functions as a tool for performing drilling operation and fastening operation by rotationally driving a tool accessory around an axis of the output shaft.

10. The rotary tool as defined in claim 6, wherein the at least one direction includes a direction orthogonal to an axis of the output shaft.

* * * * *